(12) United States Patent
Oyman

(10) Patent No.: US 10,491,861 B2
(45) Date of Patent: *Nov. 26, 2019

(54) INTERACTIVE VIDEO CONFERENCING

(71) Applicant: INTEL IP CORPORATION, Santa Clara, CA (US)

(72) Inventor: Ozgur Oyman, Palo Alto, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,150

(22) Filed: Aug. 3, 2017

(65) Prior Publication Data

US 2017/0332042 A1  Nov. 16, 2017

Related U.S. Application Data

(63) Continuation of application No. 14/807,294, filed on Jul. 23, 2015, now Pat. No. 10,021,346.

(Continued)

(51) Int. Cl.
*H04N 7/14* (2006.01)
*H04N 19/167* (2014.01)
(Continued)

(52) U.S. Cl.
CPC .......... *H04N 7/15* (2013.01); *G06K 9/46* (2013.01); *H04L 65/1006* (2013.01);
(Continued)

(58) Field of Classification Search
CPC .............. G06K 9/46; G06K 2009/4666; H04L 65/1006; H04L 65/1016; H04L 65/1069;
(Continued)

(56) References Cited

U.S. PATENT DOCUMENTS 6,496,607 B1  12/2002  Krishnamurthy
7,321,384 B1   1/2008  Wu
(Continued)

FOREIGN PATENT DOCUMENTS

CN  1914915 A    2/2007
CN  101167365 A  4/2008
(Continued)

OTHER PUBLICATIONS

3GPP TS 26.114, "IP Multimedia Telephony; Media handling and interaction", Jun. 2011, 240 pages, Version 11.0.0, Release 11.

(Continued)

*Primary Examiner* — Hemant S Patel

(74) *Attorney, Agent, or Firm* — Thorpe North & Western

(57) ABSTRACT

Technology for a multimedia telephony services over internet protocol (IP) multimedia subsystems (IMS) (MTSI) receiver operable to support region of interest (ROI) signaling with a MTSI sender is disclosed. The MTSI receiver can decode ROI information received from the MTSI sender, wherein the ROI information includes a set of predefined ROIs. The MTSI receiver can encode a selected predefined ROI for transmission to the MTSI sender in a real-time transport control protocol (RTCP) feedback message. The MTSI receiver can decode encoded video received from the MTSI sender, wherein the encoded video corresponds to the selected predefined ROI.

27 Claims, 11 Drawing Sheets

```
SDP Answer m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
       sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-arbitrary
a=extmap:4 urn:3gpp:roi-actual
```

Related U.S. Application Data

(60) Provisional application No. 62/088,283, filed on Dec. 5, 2014.

(51) Int. Cl.
 *H04L 29/06* (2006.01)
 *G06K 9/46* (2006.01)
 *H04N 7/15* (2006.01)

(52) U.S. Cl.
 CPC ...... *H04L 65/1016* (2013.01); *H04L 65/1069* (2013.01); *H04L 65/602* (2013.01); *H04L 65/607* (2013.01); *H04L 65/608* (2013.01); *H04N 7/147* (2013.01); *H04N 19/167* (2014.11); *G06K 2009/4666* (2013.01)

(58) Field of Classification Search
 CPC .............. H04L 65/1083; H04L 65/403; H04L 65/4053; H04L 65/602; H04L 65/607; H04L 65/608; H04L 65/80; H04N 7/142; H04N 7/147; H04N 7/15; H04N 19/167; H04N 21/4728; H04N 21/632; H04N 21/6437; H04N 2007/145
 See application file for complete search history.

(56) References Cited

U.S. PATENT DOCUMENTS

| | | | |
|---|---|---|---|
| 8,970,653 B2 | 3/2015 | Bowen | |
| 9,307,192 B2* | 4/2016 | Oyman | H04W 4/70 |
| 9,386,275 B2* | 7/2016 | Oyman | H04L 65/608 |
| 9,794,515 B2 | 10/2017 | Oyman | |
| 10,021,346 B2* | 7/2018 | Oyman | H04N 19/167 |
| 2003/0236908 A1 | 12/2003 | Khang | |
| 2005/0024484 A1 | 2/2005 | Leonard et al. | |
| 2005/0198338 A1 | 9/2005 | Chebil et al. | |
| 2006/0215752 A1* | 9/2006 | Lee | H04N 7/147 375/240.08 |
| 2006/0215753 A1 | 9/2006 | Lee | |
| 2006/0215766 A1 | 9/2006 | Wang | |
| 2006/0238445 A1 | 10/2006 | Wang | |
| 2006/0256851 A1 | 11/2006 | Wang et al. | |
| 2007/0076957 A1 | 4/2007 | Wang | |
| 2008/0095228 A1 | 4/2008 | Hannuksela et al. | |
| 2008/0291265 A1 | 11/2008 | Wagner et al. | |
| 2010/0002071 A1 | 1/2010 | Ahiska | |
| 2010/0026781 A1 | 2/2010 | Walid et al. | |
| 2010/0103245 A1 | 4/2010 | Decker | |
| 2010/0118111 A1* | 5/2010 | Bouazizi | H04N 7/142 348/14.08 |
| 2010/0132002 A1 | 5/2010 | Henocq et al. | |
| 2010/0158135 A1 | 6/2010 | Yin et al. | |
| 2011/0085016 A1 | 4/2011 | Kristiansen et al. | |
| 2011/0128288 A1 | 6/2011 | Petrou et al. | |
| 2011/0205333 A1 | 8/2011 | Wu et al. | |
| 2011/0249073 A1 | 10/2011 | Cranfill et al. | |
| 2011/0249074 A1 | 10/2011 | Cranfill et al. | |
| 2012/0320141 A1 | 12/2012 | Bowen et al. | |
| 2013/0101035 A1 | 4/2013 | Wang et al. | |
| 2013/0142055 A1 | 6/2013 | Bao et al. | |
| 2013/0155182 A1 | 6/2013 | Bekiares et al. | |
| 2013/0202273 A1 | 8/2013 | Ouedraogo et al. | |
| 2013/0246846 A1 | 9/2013 | Oyman | |
| 2013/0275615 A1 | 10/2013 | Oyman | |
| 2014/0046935 A1 | 2/2014 | Bengio et al. | |
| 2014/0078241 A1 | 3/2014 | Vaisburd | |
| 2014/0079118 A1 | 3/2014 | Dedeoglu | |
| 2014/0079126 A1 | 3/2014 | Ye | |
| 2014/0320587 A1 | 10/2014 | Oyman | |
| 2014/0359652 A1 | 12/2014 | Ghorbel | |
| 2015/0103927 A1 | 4/2015 | Hannuksela | |
| 2015/0180825 A1 | 6/2015 | Ren et al. | |
| 2015/0195490 A1 | 7/2015 | Oyman | |
| 2015/0334152 A1 | 11/2015 | Oyman | |
| 2016/0036704 A1 | 2/2016 | Xiao et al. | |
| 2016/0044099 A1 | 2/2016 | Oyman | |
| 2016/0100099 A1 | 4/2016 | Oyman | |
| 2016/0165185 A1* | 6/2016 | Oyman | H04N 19/167 348/14.08 |
| 2017/0111425 A1 | 4/2017 | Gell et al. | |
| 2017/0332042 A1 | 11/2017 | Oyman | |
| 2018/0013980 A1 | 1/2018 | Oyman | |

FOREIGN PATENT DOCUMENTS

| | | |
|---|---|---|
| CN | 101282452 A | 10/2008 |
| CN | 101404726 A | 4/2009 |
| CN | 101453639 A | 6/2009 |
| CN | 101755454 A | 6/2010 |
| CN | 102215373 A | 10/2011 |
| CN | 102648626 A | 8/2012 |
| CN | 103384319 A | 11/2013 |
| CN | 103581544 A | 2/2014 |
| CN | 103686056 A | 3/2014 |
| EP | 2343879 A1 | 7/2011 |
| JP | 2002519915 A | 7/2002 |
| JP | 2008535423 A | 8/2008 |
| KR | 10-2009-0026781 A1 | 1/2009 |
| KR | 10-2009-0020421 A | 2/2009 |
| KR | 10-2013-0010003 A | 1/2013 |
| TW | 201303786 A | 1/2013 |
| WO | WO 2010107411 A1 | 9/2010 |
| WO | WO 2011/126511 A1 | 10/2011 |
| WO | WO 2014/176087 A1 | 10/2014 |

OTHER PUBLICATIONS

3GPP TS 26.140, "Multimedia Messaging Service (MMS); Media formats and codecs", Mar. 2012, 13 pages, Version 11.0.0 Release 11.

3GPP TS 26.244, "Transparent end-to-end packet switched streaming service (PSS); 3GPP file format (3GP)", Jun. 2012, 58 pages, Version 11.0.0, Release 11.

3GPP TS 26.247, "Transparent end-to-end Packet-switched Streaming Service (PSS); Progressive Download and Dynamic Adaptive Streaming over HTTP (3GP-DASH)", Sep. 2012, 112 pages, Version 11.0.0, Release 11.

3GPP TS 26.346, "Multimedia Broadcast/Multicast Service (MBMS); Protocols and codecs", Mar. 2012, 163 pages, Version 11.0.0, Release 11.

Extended European search report for European Application No. 15733222.2 filed Jan. 6, 2015; date of completion of the search Jul. 4, 2017; 15 pages.

INTEL, "ROI Permanent Document—Requirements, Working Assumptions and Potential Solutions", 3GPP TSG-SA4 S4-140975 (revision of S4-140820), Version 0.3, Agenda 11.7, Meeting 80, 5 pages, Aug. 2014, San Francisco, CA, USA.

INTEL, "ROI Permanent Document—Requirements, Working Assumptions and Potential Solutions", 3GPP TSG-SA4 S4-150446, Version 1.1.0, Agenda 10.5.4, Meeting 83, 14 pages, Apr. 2015, Bratislava, Slovakia.

ITU-T H.282, "Remote device control protocol for multimedia applications", Series H: Audiovisual and Multimedia Systems, May 1999, 23 pages.

Ott et al, "Extended RTP Profile for Real-time Transport Control Protocol (RTCP)—Based Feedback (RTP/AVPF)", Network Working Group Request for Comments: 4585, Jul. 2006, 52 pages.

Polycom, "H.FEMC: Proposed updates", Telecommunication Standardization Sector COM 16-C332 R1-E, Study Group 16—Contribution 332 R1, Oct. 2013, 97 pages.

Singer, "A General Mechanism for RTP Header Extensions", Network Working Group Request for Comments: 5285, Jul. 2008, 18 pages.

3GPP TS 26.114; "3rd Generation Partnership Project; Technical Specification Group Services and System Aspects; IP Multimedia

(56) References Cited

OTHER PUBLICATIONS

Subsystem (IMS); Multimedia Telephony; Media Handling and Interaction;" (Sep. 2014); 17 pages; V12.7.0 (Release 12).

* cited by examiner

SDP Offer

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-arbitrary
a=extmap:4 urn:3gpp:roi-predefined
```

FIG. 4A

SDP Answer

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-arbitrary
```

FIG. 4B

SDP Offer

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
     sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-arbitrary
a=extmap:4 urn:3gpp:roi-actual
```

FIG. 5A

SDP Answer

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-roi-arbitrary
a=extmap:4 urn:3gpp:roi-actual
```

FIG. 5B

INTERACTIVE VIDEO CONFERENCING

RELATED APPLICATIONS

The present application is a continuation of U.S. patent application Ser. No. 14/807,294, filed Jul. 23, 2015, which claims priority to U.S. Provisional Patent Application No. 62/088,283, filed Dec. 5, 2014, the entire specifications of which are hereby incorporated by reference in their entirety for all purposes.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4A illustrates a session description protocol (SDP) offer message indicating a predefined region of interest (ROI) signaling capability and an arbitrary ROI signaling capability that is communicated using a real-time transport protocol (RTP) header extension technique in accordance with an example;

FIG. 4B illustrates a session description protocol (SDP) offer message accepting an arbitrary region of interest (ROI) signaling capability that is communicated using a real-time transport protocol (RTP) header extension technique in accordance with an example;

FIG. 5A illustrates a session description protocol (SDP) offer message indicating an arbitrary region of interest (ROI) signaling capability and an actual ROI that is communicated using a real-time transport control protocol (RTCP) feedback technique in accordance with an example;

FIG. 5B illustrates a session description protocol (SDP) answer message accepting an arbitrary region of interest (ROI) signaling capability and an actual ROI that is communicated using a real-time transport control protocol (RTCP) feedback technique in accordance with an example;

Figure 1:
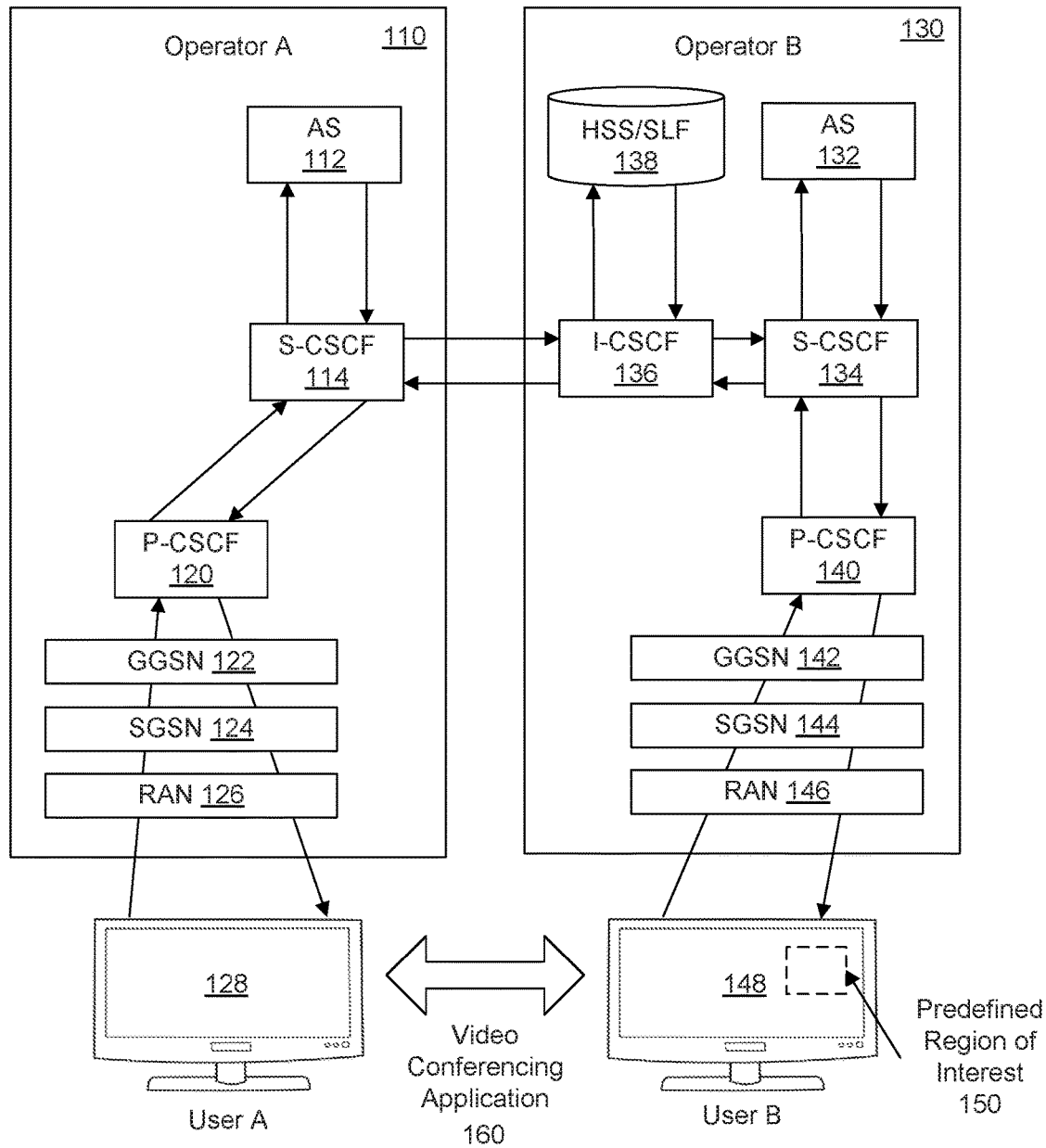
FIG. 1 illustrates a multimedia telephony services over IMS (MTSI)-based video conferencing system that supports a region-of-interest (ROI) zooming feature in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for operating a video conferencing application at a local user equipment (UE) that supports an interactive zooming feature. A local user at the local UE can communicate with a remote user at a remote UE by using the video conferencing application. In other words, the local user can view a scene that includes the remote user via the video conferencing application. The scene can be displayed on a display screen of the local UE. In one example, the local UE can receive, from the remote UE, a set of predefined regions within the scene. These predefined regions within the scene can be referred to as predefined regions of interest (ROIs). Each predefined ROI can be within a field of view of a camera of the remote UE.

As a non-limiting example, a first predefined ROI can correspond with a top-left region of the scene, and a second predefined ROI can correspond with a bottom-right region of the scene. In addition, each predefined ROI can be associated with a set of ROI coordinates.

The local UE can select one of the predefined ROIs from the set of predefined ROIs when the local user desires a more detailed representation of contents within that predefined ROI. Therefore, each predefined ROI can be a possible region in which the local user can zoom into via the video conferencing application in order to view additional detail of the region. The local UE can send the predefined ROI that is selected by the local user to the remote UE.

The remote UE can capture video within the predefined ROI that is received from the local UE. The remote UE can encode the video within the predefined ROI. The encoded video can include regions within the predefined ROI and exclude regions outside the predefined ROI. The remote UE can transmit the encoded video to the local UE. The encoded video can include the regions within the predefined ROI at an increased zoom level while substantially maintaining a defined quality level. In other words, the remote UE can provide the encoded video within the predefined ROI in order to enable playback of the encoded video at the local UE. By the remote UE transmitting only the selected area of the scene (i.e., the predefined ROI) to the local UE, and excluding the non-selected area of the scene from transmission, the video conferencing application can more efficiently use the available bandwidth. In addition, the local user can dynamically switch from viewing a video feed of the entire scene (e.g., the entire field of view of the camera of the remote UE) to viewing only the selected region within the scene (e.g., a partial field of view of the camera of the remote UE) using the interactive zooming feature.

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). The 3GPP TS 26.140 describes media handling and interaction, which includes media control, media codecs, and the transport of media and control data. The 3GPP TS 26.140 also enables video sharing using multimedia sharing services (MMS), in which support for the 3GP file format is provided.

As described in further detail below, a MTSI call can use call session control function (CSCF) mechanisms to reroute control-plane signaling between the UEs involved in the call (e.g., the video conference application). In the control plane, application servers (AS) can be present and provide supplementary services, such as call hold or resume, call forwarding and multi-party calls, etc.

An MTSI-based transmitter UE terminal can capture and record video, and then transfer the video to an MTSI-based receiver UE terminal over a 3GPP network. The receiver UE terminal can then decode and render the video. In MTSI, the session initiation protocol (SIP) can serve as the application-layer control protocol to establish, modify, and terminate conversational multimedia sessions, such as video conferences, Internet telephony calls, and others. Session description protocol (SDP) based signaling between the sending and receiving terminals can allow for offer/answer considerations in the media-related capability negotiation, including codecs, bitrates, resolutions, etc. The transport of media in MTSI is based on the real-time transport protocol (RTP) (specified by IETF RFC 3550) over UDP/IP.

The resolutions of capture devices, and therefore compressed videos, are rapidly increasing. For example, using the recent High Efficiency Video Coding (HEVC) standard, 4K content can be transported and stored as part of an operational product. Cameras having 4k-by-2k resolution are now widely available. Live streaming video has been demonstrated with resolutions of 8k-by-4k. Resolutions, in terms of numbers of pixels, are likely to increase in the future. With these very high resolution contents, new usages in video streaming are now possible, such as interactive zooming features.

Conversational video services that are currently present in the marketplace, such as MTSI, enable dynamic adaptation of video in terms of bandwidth, spatial resolution, orientation, etc. However, these conversational video services do not enable users to dynamically switch to a user-selected area in the video being streamed, and optimize encodings for this user-selected area. As a result, the achievable video resolution during the usage of interactive zoom features in video calls can be limited. Although a receiver application can zoom in to the region-of-interest (ROI) and crop out the unwanted parts of the video (e.g., in response to the commands from a user interface), one limitation of current systems is that the sending terminal would still encode and transmit the entire video frame in the absence of any ROI signaling from the receiving terminal.

In one example, signaling of the ROI information from an MTSI receiver to an MTSI sender can enable the MTSI sender to deliver a higher quality stream. The MTSI sender can use a negotiated bitrate entirely or preponderantly on the encoding of the ROI part of the video. To enable this, signaling in both directions can be performed. The MTSI sender can send messages to the MTSI receiver to express capability, and the MTSI receiver can send messages to the MTSI sender to express the desired ROI.

FIG. 1 illustrates an exemplary multimedia telephony services over IMS (MTSI)-based video conferencing system that supports a region-of-interest (ROI) zooming feature. A user (e.g., user A) associated with a remote user equipment (UE) 128 (e.g., a mobile phone, a tablet computer, a desktop computer, or other suitable device) can be video conferencing with another user (e.g., user B) associated with a local UE 148. In other words, both the remote UE 128 and the local UE 148 can be running a two-way video conferencing application 160. The user A can be in proximity to the remote UE 128 (e.g., in front of the remote UE 128) and the user B can be in proximity to the local UE 148 (e.g., in front of the local UE 148). Both the remote UE 128 and the local UE 148 can each include a camera that enables the users to view each other while the video conferencing application 160 is running. The remote UE 128 can include a remote camera and the local UE 148 can include a local camera. The remote UE 128 can include a camera that captures video of user A during operation, and a display screen, which displays video of user B to user A during operation. Similarly, the local UE 148 can include a camera that captures video of user B during operation, and a display screen, which displays video of user A to user B during operation. In other words, user A can view user B via the display screen on the remote UE 128, and user B can view user A via the display screen on the local UE 148.

In one example, the video conferencing application 160 can be over an MTSI-based conversational video system. In other words, the video conferencing application 160 can operate over 3GPP-based multimedia telephony services, which connect the remote UE 128 and the local UE 148 to each other and to the telephone network.

The remote UE 128 can connect to the core network through a radio access network (RAN) 126, a serving general packet radio service (GPRS) support node (SGSN) 124, and/or a gateway GPRS support node (GGSN) 122. The remote UE 128 can send and receive data through a proxy call session control function (P-CSCF) 120. The P-CSCF 120 can send and receive data with a serving call session control function (S-CSCF) 114. In some examples, the S-CSCF 114 can send and receive data from an application server (AS) 122, which can provide supplementary services, such as call hold/resume, call forwarding and multi-party calls, etc. In this example, the RAN 126, the SGSN 124, the GGSN 122, the P-CSCF 120, the S-CSCF 114, and the AS 112 can be associated with an operator A 110. The S-CSCF 114 can send and receive data from other parts of the core network. For example, the S-CSCF 114 that is associated with Operator A 110 can communicate with an interrogating CSCF (I-CSCF) 136 that is associated with an operator B 130.

The local UE 148 can connect to the core network through its own radio access network (RAN) 146, serving general packet radio service (GPRS) support node (SGSN) 144, and gateway GPRS support node (GGSN) 142. The local UE 148 can send and receive data through a proxy call session control function (P-CSCF) 140. The P-CSCF 140 can send and receive data with a serving call session control function (S-CSCF) 134. In some examples, the S-CSCF 134 can send and receive data from an application server (AS) 132, which can provide supplementary services, such as call hold/resume, call forwarding and multi-party calls, etc. The S-CSCF 114 and the S-CSCF 134 can each communicate with an interrogating CSCF (I-CSCF) 136. In other words, operator A 110 can communicate with operator B 130 via communications between the S-CSCF 114 and the I-CSCF 136. The I-CSCF 134 can read and write to a home subscriber server (HSS) 138 and/or a subscriber location function (SLF) 138. In this example, the RAN 146, the SGSN 144, the GGSN 142, the P-CSCF 140, the HSS/SLF 138, the I-CSCF 136, the S-CSCF 134, and the AS 132 can be associated with the operator B 130.

In one configuration, the video conferencing application 160 can support a zooming feature. For example, the local UE 148 can zoom into a particular feature or location in the field of view of the remote camera (i.e., the camera associated with the remote UE 128). The local UE 148 can receive a set of predefined ROIs from the remote UE 128. The predefined ROIs can correspond to various regions within the field of view of the remote camera. For example, the remote UE 128 can send a set of ten predefined ROIs to the local UE 148, wherein each of the predefined ROIs in the set correspond to a distinct region within the remote camera's field of view. As non-limiting examples, the predefined ROIs can correspond to a top right portion of the remote camera's field of view, a bottom left portion of the remote camera's field of view, etc. The local user at the local UE 148 can select a predefined ROI 150 from the set of predefined ROIs received from the remote UE 128.

In an alternative configuration, at the local UE 148, user B can define an arbitrary region of interest (ROI) within a field of view at the remote UE 128. As a non-limiting example, at the remote UE 128, the user A may view the user B's head on the display screen of the remote UE 128. At the local UE 148, the user B may view the user A's head and torso on the display screen of the local UE 148. The user B may desire an enhanced view of the user A (e.g., the user B may desire to zoom into user A's face). User B can define the arbitrary ROI at the local UE, such that the arbitrary ROI includes user A's face. The arbitrary ROI can be defined at the local UE 148 using, for example, a graphical user interface. In other words, the user B may select the region using an input device, such as a computer mouse or a touch screen. The arbitrary ROI can include other suitable regions within the field of view of the remote camera. For example, the user B can define the arbitrary ROI to include user A's torso, a tree behind user A, etc. As other examples, the arbitrary ROI can include a top right region of the display screen of the local UE 148 (which corresponds to an appropriate field of view of the remote camera), a lower left region of the display screen of the local UE 148, etc.

The arbitrary ROI can be considered a dynamic entity that is selected by the local user, whereas the predefined ROI 150 can be considered as being more static. In other words, rather than the ROI being specifically requested from the local UE 148, the ROI that is selected can already be predefined at the remote UE 128. Both the arbitrary ROI and the predefined ROI can be associated with a set of ROI coordinates.

The predefined ROI 150 that is selected by the local user can be sent from the local UE 148 to the remote UE 128. As discussed in further detail below, the predefined ROI 150 can be communicated using a real-time transport protocol (RTP) message or a real-time transport control protocol (RTCP) feedback message. The RTP message or the RTCP feedback message can direct the remote UE 128 to capture video within the predefined ROI 150. Alternatively, the arbitrary ROI (e.g., ROI coordinates associated with the arbitrary ROI) can be sent from the local UE 148 to the remote UE 128, which can direct the remote UE 128 to capture video within the arbitrary ROI.

In some examples, the remote UE 128 can capture video that includes only the predefined ROI 150 and excludes regions outside the predefined ROI 150. As a non-limiting example, the RTP header extension or the RTCP feedback message (that includes an indication of the predefined ROI 150 that is selected) can instruct the remote UE 128 to capture a wound on the user A's chin. In other words, the remote UE's camera can capture only the wound on the user A's chin, and no other regions that surround the user A's chin.

Upon capturing the video in accordance with the predefined ROI 150, the remote UE 128 can encode the video, for example, using an encoding scheme with relatively low compression. Therefore, the video can provide a relatively close-up and detailed view of the predefined ROI 150, while substantially maintaining a defined level of quality. The remote UE 128 can encode the video (with the predefined ROI 150) with the less lossy encoding scheme because the resources that were previously used to encode the entire field of view are now only used to encode the predefined ROI 150. In one example, an encoder of the remote UE 128 does not encode each of the predefined ROIs, as this can computationally overburden the encoder. Rather, the remote UE 128 can receive the predefined ROI 150 that is selected, and the encoder of the remote UE 128 can encode only the predefined ROI 150

The remote UE 128 can transmit the encoded video (with only the predefined ROI 150) to the local UE 148. Since the remote UE 128 may consume substantially the same amount of bandwidth when transmitting the encoded video (with only the predefined ROI 150), as opposed to the full field of view of the remote camera (associated with the remote UE 128), the encoded video can be of substantially high quality. In other words, the encoded video of the predefined ROI 150 can be relatively clear and not grainy or blurry. In this regard, the technique described herein is superior to previous technologies where a user (e.g., the user B) manually zooms into the frame displayed on the display screen, which can lead to a reduced quality level. In the current solution, the remote UE 128 can encode only the predefined ROI 150 with a negotiated resolution rather than the whole captured frame, and this would lead to a higher overall resolution and better user experience at the local UE 148.

As a non-limiting example, the remote UE 128 can encode a video of the wound on the user A's chin. The remote UE 128 can use an encoding scheme with relatively low compression, such that the user A's chin is viewable with a relatively large resolution and clarity level. In other words, the encoded video can be a zoomed in representation of the user A's chin, but still maintains a relatively high quality level (e.g., not grainy). In addition, an entire bandwidth can be used for sending the encoded video of the user A's chin, which can result in a relatively clear and detailed representation of the user A's chin. This representation can provide additional details of the user A's face as opposed to if all of the user A's face was included as part of the encoded video.

In an alternative configuration, the remote UE 128 can capture video that includes the full field of view of the remote camera (associated with the remote UE 128). However, the remote UE 108 can only encode a portion of the video that includes the predefined ROI 150. In addition, the remote UE 108 can transmit the encoded video that includes only the predefined ROI 150 and excludes regions outside the predefined ROI 150.

The local UE 148 can receive the encoded video from the remote UE 128, where the encoded video includes regions within the predefined ROI 150 and excludes regions outside the predefined ROI 150. The local UE 148 can render and display the encoded video on the display screen associated with the local UE 148. As a non-limiting example, the user B sitting in front of the local UE 148 can view a detailed and close-up representation of the wound on the user A's chin. The user B can always revert back to a previous view of the user A, e.g., the user B can un-zoom and revert back to viewing the user A's entire face and torso on the display screen of the local UE 148.

As a non-limiting example, a user can be on vacation in Paris. The user can make a video call via a mobile device to a tourist assistant center. In this example, the mobile device can be a local user equipment (UE) and the tourist assistant center can be a remote UE. The tourist assistant center can service a webcam view from the Eiffel tower. At the beginning of the video call, the tourist assistant center can present a number of predefined ROIs to the mobile device. The predefined ROIs presented to the mobile device can correspond to fields of view of the webcam. Some examples of the predefined ROIs can include "Sacre Coeur", "Musée Rodin", and "Palais du Louvre"). The user can select the predefined ROI associated with "Sacre Coeur" via the mobile device, and live video streaming corresponding to the predefined ROI can be provided to the mobile device. At a later time, the user can select a different predefined ROI that is associated with "Musée Rodin" via the mobile device, and the live video streaming that is being provided to the mobile device can be switched to correspond to the different predefined ROI.

In one example, the local UE 148 and the remote UE 128 can be engaged in a multi-party video conference. The multi-party video conference can include four people, wherein the local user is in proximity to the local UE 148 and three remote users are in proximity to the remote UE 128. Since it is likely that the local user will want to zoom in on one of the three remote users in the multi-party video conference, the remote UE 128 can predict which ROIs the local UE 148 is likely to request. Rather than the local UE 148 creating ROI coordinates dynamically and sending the ROI coordinates to the remote UE 128, the remote UE 128 can predict the ROIs that correspond to the three remote users, generate a set of predefined ROIs based on the predicted ROIs, and then send the set of predefined ROIs to the local UE 148. For example, a first predefined ROI can correspond to a first remote user, a second predefined ROI can correspond to a second remote user, and a third predefined ROI can correspond to a third remote user. The local user may be able to select one of the predefined ROIs during the multi-party video conference. For example, the local user may select the first predefined ROI when the first remote user is speaking in order to view a zoom-in video feed of the first remote user, and then when the third remote user begins speaking, the local user may select the third predefined ROI in order to view a zoom-in video feed of the third remote user. As long as the local UE 148 does not select a different predefined ROI 150, the remote UE 128 can assume that the local UE 148 still wants to receive video within the predefined ROI 150. In other words, if no new predefined ROI 150 is selected, then the remote UE 128 can continue to encode the same region In one configuration, if a target within the remote camera's field of view is moving, the remote UE 128 can detect the motion (e.g., via a motion sensor at the remote UE 128) and adjust the ROI. For example, the remote UE can generate a modified ROI in response to detected motion within the remote camera's field of view. The remote UE 128 can provide encode video within the modified ROI for rendering and display at the local UE 128.

As a non-limiting example, the local UE 148 and the remote UE 128 can be engaged in a multi-party video conference, wherein the local user is communicating with three remote users via a video conferencing application. The encoded video being provided to the local UE 148 can initially correspond to a first remote user that is speaking. The encoded video can correspond to a predefined ROI. The first remote user (e.g., the target) may be pacing back and forth in the room while speaking. In this example, the remote UE 128 can detect that the target is moving and automatically adjust the predefined ROI locally (i.e., without instructions from the local UE 148). In other words, the remote UE 128 can automatically adjust the ROI coordinates associated with the predefined ROI in order to generate the modified ROI, and then encode and provide only video associated with the modified ROI. If the remote UE 128 has the ability to detect movement, the remote UE 128 can adjust the ROI coordinates locally and does not need signaling on behalf of the local UE 148.

The ability to detect motion and locally adjust the ROI coordinates of the predefined ROI can prevent additional signaling between the local UE 148 and the remote UE 128. In past solutions that utilize arbitrary ROIs, if a target moves and the arbitrary ROI needs to be readjusted, then the local UE 148 can send an updated set of ROI coordinates to the remote UE 128, which causes additional signaling. However, in this configuration, no additional signaling is needed because the remote UE 128 can automatically adjust the video that is being encoded and sent to the local UE 148.

Figure 2:
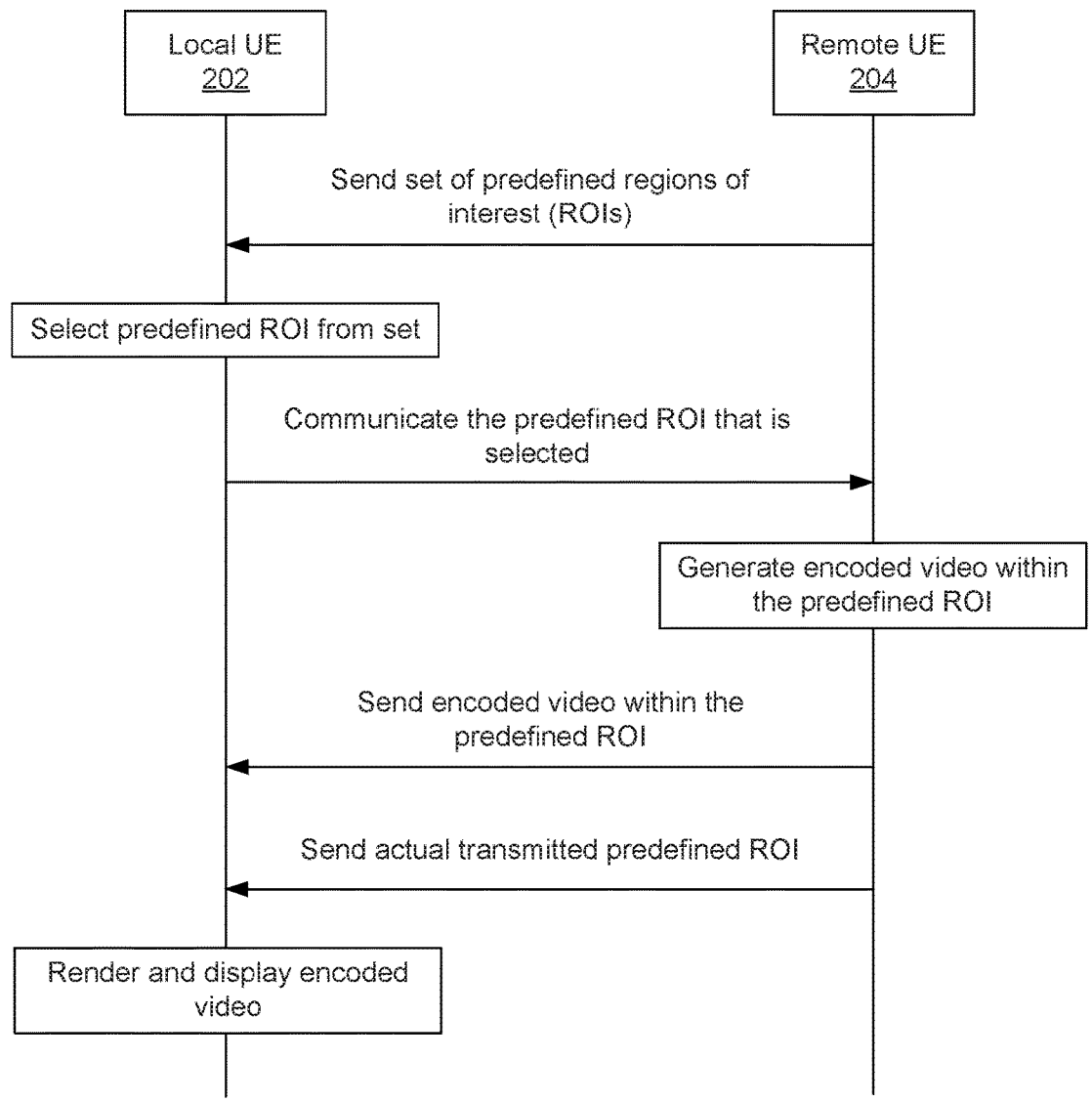
FIG. 2 is a flow diagram that depicts signaling between a local user equipment (UE) and a remote UE for initiating a region-of-interest (ROI) zooming feature in accordance with an example.

FIG. 2 is an exemplary flow diagram that depicts signaling between a local user equipment (UE) 202 and a remote UE 204 for initiating a region-of-interest (ROI) zooming feature. In one example, the local UE 202 and the remote UE 204 can be video conferencing with one another. For example, both the local UE 202 and the remote UE 204 can operate a video conferencing application that supports a defined ROI-based interactive zooming feature. The local UE 202 can receive a set of predefined region of interests (ROIs) from the remote UE 204. The set of predefined ROIs can be within a field of view of a camera of the remote UE 204. As a non-limiting example, the set can include five different predefined ROIs that each correspond to a particular area of the camera's field of view at the remote UE 204. The local UE 202 can select a predefined ROI from the set of predefined ROIs received from the remote UE 204.

The local UE 202 can communicate the predefined ROI that is selected to the remote UE 204 via a real-time transport control protocol (RTCP) feedback message. The RTCP feedback message can direct the remote UE 204 to capture video within the predefined ROI and encode the video within the predefined ROI. For example, the RTCP feedback message can include a descriptor that defines the predefined ROI that is selected from the set of predefined ROIs.

In one example, the remote UE 204 can capture the encoded video using a fixed non-moving camera of the remote UE 204. The remote UE 204 can generate the encoded video within the predefined ROI, such that the encoded video includes regions within the predefined ROI and excludes regions outside the predefined ROI. In addition, the encoded video can include the regions within the predefined ROI at an increased zoom level while substantially maintaining a defined quality level. The remote UE 204 can send the encoded video within the predefined ROI to the local UE 202.

The local UE 202 can receive the encoded video from the remote UE 204. In addition, the local UE 202 can receive actual transmitted predefined ROI that corresponds to the encoded video via a real-time transport protocol (RTP) header extension. The RTP header extension can be included in RTP packets received from the remote UE 204 that contain the encoded video. The RTP header extension can include a descriptor that defines the actual transmitted predefined ROI corresponding to the encoded video. In one example, the RTP header extension can include a position and a size associated with the actual transmitted predefined ROI that corresponds to the encoded video. The position can include two position values indicative of a corner position of the actual transmitted predefined ROI within the field of view at the remote UE 204. The two position values can be normalized to indicate relative position in two dimensions. The size can include two size values indicative of a size of the actual transmitted predefined ROI within the field of view at the remote UE 204, wherein the two size values are normalized to indicate relative size in two dimensions.

The local UE 202 can provide the encoded video within the predefined ROI for rendering and display at the local UE 202. For example, the encoded video can be played via the video conferencing application that is being executed at the local UE 202. In one example, the encoded video that is received at the local UE 202 can display a target that is being captured at the remote UE 204.

In one configuration, the remote UE 204 can include a motion detector or motion sensor that detects movement in front of the remote UE's camera. In other words, movement of the target can occur within the field of view of the camera of the remote UE 204. The remote UE 204 can determine to adjust the predefined ROI based on the movement. In other words, the remote UE 204 can detect motion within the field of view of the remote UE's camera, and then determine a modified ROI based on the detected motion. The remote UE 204 can generate encoded video within the modified ROI, wherein the encoded video can include regions within the modified ROI and exclude regions outside the modified ROI. The remote UE 204 can send the encoded video to the local UE 202. The local UE 202 can receive the encoded video within the modified ROI from the remote UE 204. The local UE 202 can provide the encoded video within the modified ROI for rendering and display at the local UE 202. Therefore, the local UE 202 can automatically receive encoded video in accordance with the modified ROI when movement of the target is detected at the remote UE 204.

Figure 3:
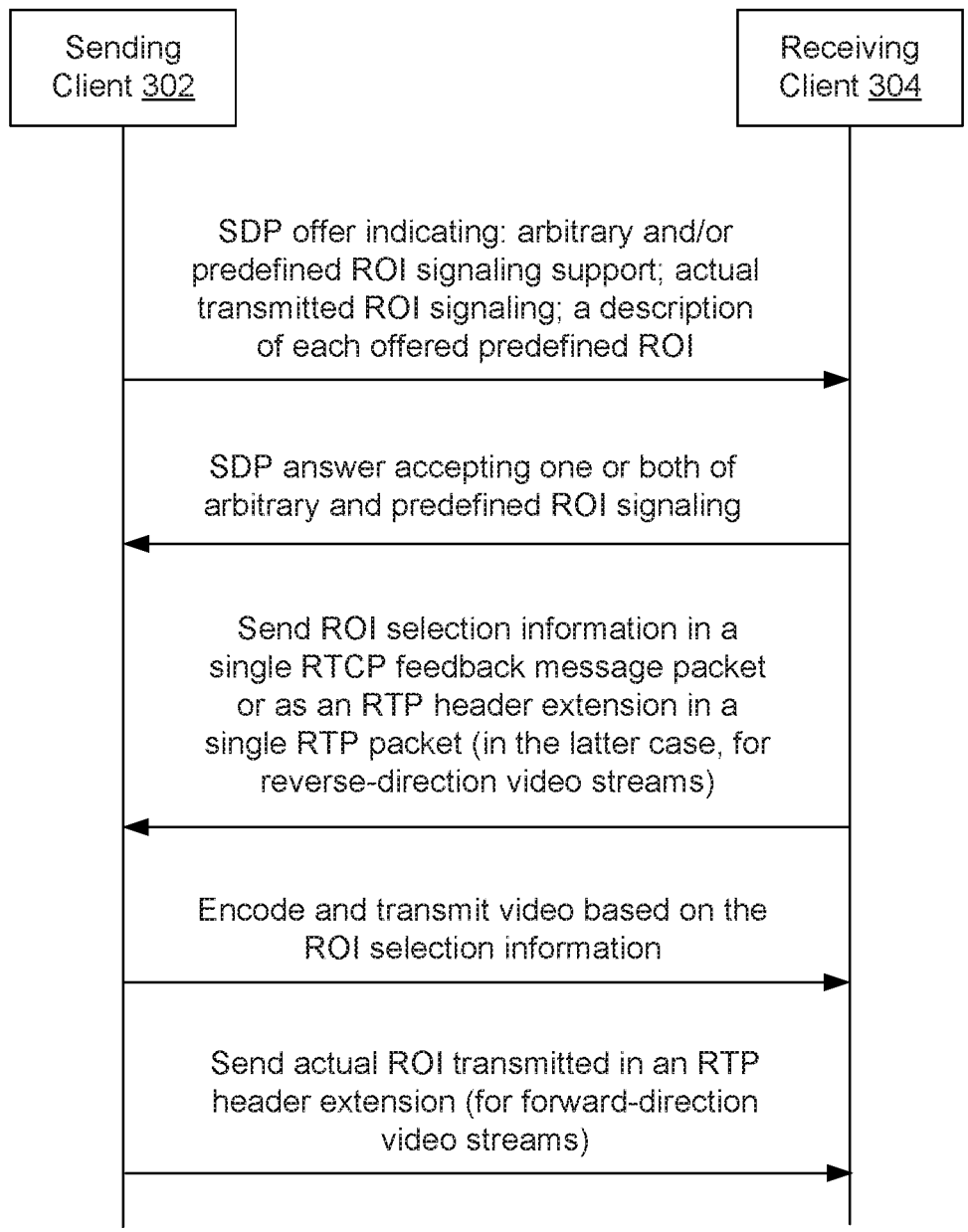
FIG. 3 is a flow diagram that depicts signaling between a sending client and a receiving client for initiating a region-of-interest (ROI) zooming feature in accordance with an example.

FIG. 3 is an exemplary flow diagram that depicts signaling between a sending client 302 and a receiving client 304 for initiating a region-of-interest (ROI) zooming feature. The sending client 302 can also be referred to as a remote user equipment (UE) and the receiving client 304 can also be referred to as a local UE. The sending client 302 and the receiving client 304 can each run a video conferencing application that allows a remote user associated with the sending client 302 to communicate with a local user associated with the receiving client 304.

Session description protocol (SDP)-based signaling between the sending client 302 and the receiving client 304 can allow for offer/answer considerations in the media-related capability negotiation for ROI zooming.

The sending client 302 can send an SDP offer to the receiving client 304 that indicates arbitrary ROI signaling support and/or predefined ROI signaling support at the sending client 302. The sending client 302 can send the indication of arbitrary ROI and/or predefined ROI signaling support in response to a request from the receiving client 304. The sending client 302 can send the SDP offer using a real-time transport control protocol (RTCP) feedback message. In some cases, the SDP offer can include actual transmitted ROI signaling, as well as a description of each offered predefined ROI.

The receiving client 304 can send an SDP answer to the sending client 302 that accepts or acknowledges the sending client's support of arbitrary ROI signaling and/or predefined ROI signaling. In addition, the receiving client 304 can send ROI selection information (i.e., which predefined ROI is selected at the receiving client 304) to the sending client 302. The receiving client 304 can send the ROI selection information in a single RTCP feedback message. Alternatively, the receiving client 304 can send the ROI selection information as a real-time transport protocol (RTP) header extension in a single RTP packet. The receiving client 304 can communicate the ROI selection information to the sending client 302 using the RTP header extension for reverse-direction video streams.

The sending client 302 can encode and transmit video based on the ROI selection information. In other words, the sending client 302 can encode and transmit video based on the selected predefined ROI. In addition, the sending client 302 can send actual transmitted predefined ROI to the receiving client 304 using an RTP header extension. The receiving client 304 can communicate the actual transmitted predefined ROI to the receiving client 304 using the RTP header extension for forward-direction video streams.

When the ROI selection information is signaled from the receiving client 304 to the sending client 302 using the RTCP message, an MTSI client that supports the ROI-zoom feature can offer ROI-zoom in SDP messages for all media streams containing video. The ROI-zoom feature can be offered by including the a=rtcp-fb attribute with novel ROI-zoom types under the relevant media line scope. For instance, the ROI-zoom types in conjunction with the RTCP feedback technique can be expressed with the following parameters: 3gpp-roi-arbitrary and 3gpp-roi-predefined. A wildcard payload type ("*") can be used to indicate that the RTCP feedback attribute enhanced FECC applies to all payload types. If several types of ROI feedback are supported and/or the same ROI feedback is to be specified for a subset of the payload types, then several "a=rtcp-fb" lines can be used. An example usage of this attribute to signal ROI-zoom relative to a media line based on the RTCP feedback technique is: a=rtcp-fb:*3gpp-roi-arbitrary and a=rtcp-fb:*3gpp-roi-predefined.

The RTCP feedback technique can involve signaling of the ROI selection information in both of the immediate feedback and early RTCP modes. The novel RTCP feedback types for ROI-zoom can include: (1) a value name of 3gpp-roi-arbitrary, a long name of arbitrary region-of-interest (ROI) information, and a reference of Third Generation Partnership Project (3GPP) Technical Specification (TS) 26.114; and (2) a value name of 3gpp-roi-predefined, a long name of predefined region-of-interest (ROI) information, and a reference of Third Generation Partnership Project (3GPP) Technical Specification (TS) 26.114.

In the Augmented Backus-Naur Form (ABNF) for the value of rtcp-fb-val, as defined in Internet Engineering Task Force (IETF) request for comments (RFC) 4585, there is a placeholder called rtcp-fb-id to define new feedback types. "3gpp-roi-arbitrary" and "3gpp-roi-predefined" are defined as new feedback types for ROI information signaling, and the ABNF can be given as follows: rtcp-fb-val=/"3gpp-roi-arbitrary" and rtcp-fb-val=/"3gpp-roi-predefined".

When the ROI information is signaled from the receiving client 304 to the sending client 302 using the RTP header extension message, an MTSI client that supports the ROI-zoom feature can offer ROI-zoom in SDP messages for all media streams containing video. The ROI zooming feature can be offered by including the a=extmap attribute indicating the ROI-Zoom uniform resource name (URN) under the relevant media line scope. For instance, the ROI-Zoom URN can be set as: urn:3gpp:roi-actual. An example of a media line that includes this URN is: a=extmap:7 urn:3gpp:roi-actual. In the above example of a media line, the number 7 can be replaced with any number in the range of 1 and 14.

The ROI-Zoom capability can be supported bi-directionally or uni-directionally depending on how clients negotiate to support the feature during SDP capability negotiations. For clients with asymmetric capability (e.g. the ability to process ROI information but not detect/signal ROI information), the "sendonly" and "recvonly" attributes can be used. Clients are to express their capability in each direction sufficiently clearly, such that signals are only sent in each direction to the extent that they both express useful information and can be processed by the recipient.

In one example, the predefined and ROI signaling support can be offered at the same time or separately. When both capabilities are successfully negotiated by the sending client 302 and the receiving client 304, the receiving client 304 can determine to request the arbitrary ROI or one of the predefined ROIs at a given time. For example, the receiving client 304 can include a descriptor of the requested predefined ROI in the RTCP feedback message, wherein the receiving client 304 selects one of the predefined ROIs offered by the sending client 302. When the predefined ROIs are offered by the sending client 302, it can also be the responsibility of the sending client 302 to detect and track any movements of the ROI, e.g., the ROI can be a moving car, a moving person, etc. The sending client 302 can employ suitable camera technology that enables the movements of the ROI to be detected and tracked.

The ROI zooming feature includes signaling of the current ROI of the receiving user to the sending client 302 so that the sending UE can optimally encode and transmit the captured video. When ROI-Zoom is successfully negotiated, it can be signaled by the MTSI client. The signaling of the ROI-Zoom can use RTCP feedback reporting or RTP Header Extensions.

When using RTCP feedback reports, the receiving client 304 includes the current ROI information of the user (e.g., an arbitrary ROI or one of the predefined ROIs) in the RTCP reports it is transmitting to the sending client 302. When using RTP header extensions, the sending client 302 can include the actual transmitted ROI for the encoded video in the RTP packets it is transmitting to the receiving client 304.

In one example, two attributes can be used to define the arbitrary ROI to be included in the RTCP feedback messages (requested by the receiving client 304) or actual transmitted ROI in RTP header extensions (signaled by the sending client 302). One attribute is position, which can specify an upper left corner of the area covered in the original content, or can specify another suitable location. The other attribute is size, which can specify the size of the area covered in the original content in relative values. For instance, a non-limiting example of position can be "0:0", and a non-limiting example of size can be "0.33:0.33".

The presence of ROI-Zoom should not impact the negotiated resolutions (based on SDP imageattr attribute) between the sending and receiving clients. The only difference is that the sending client 302 would encode only the ROI with the negotiated resolution rather than the whole captured frame, and this would lead to a higher overall resolution and better user experience than having the receiving terminal zoom in on the ROI and crop out the rest of the frame. The sending terminal can potentially indicate ROI as part of the RTP header extension in RTP packets for its forward-direction video streams.

FIG. 4A illustrates an exemplary session description protocol (SDP) offer message. The SDP offer message can be communicated from a remote user equipment (UE) to a local UE. The SDP offer message can be based on a real-time transport protocol (RTP) header extension technique. The SDP offer message can indicate predefined ROI and arbitrary ROI signaling capability at the remote UE. As an example, the SDP offer message can include an RTCP feedback attribute that is associated with a Third Generation Partnership Project (3GPP) ROI-predefined parameter and an RTCP feedback attribute that is associated with a 3GPP ROI-arbitrary parameter.

FIG. 4B illustrates an exemplary session description protocol (SDP) answer message. The SDP answer message can be communicated from a local user equipment (UE) to a remote UE. The SDP answer message can be based on a real-time transport protocol (RTP) header extension technique. As an example, the SDP answer message can accept can accept only an arbitrary ROI signaling capability of the remote UE. As an example, the SDP answer message can include an RTCP feedback attribute that is associated with a Third Generation Partnership Project (3GPP) ROI-arbitrary parameter.

FIG. 5A illustrates an exemplary session description protocol (SDP) offer message. The SDP offer message can be communicated from a remote user equipment (UE) to a local UE. The SDP offer message can be based on a real-time transport control protocol (RTCP) feedback technique. As an example, the SDP offer message can indicate arbitrary ROI signaling capability at the remote UE. In addition, the SDP offer message can include actual ROI signaling by the sender (i.e., the remote UE). As an example, the SDP offer message can include an RTCP feedback attribute that is associated with a Third Generation Partnership Project (3GPP) ROI-arbitrary parameter. As another example, the SDP offer message can include an extension map attribute that is associated with a Third Generation Partnership Project (3GPP) ROI-actual parameter.

FIG. 5B illustrates an exemplary session description protocol (SDP) answer message. The SDP answer message can be communicated from a local user equipment (UE) to a remote UE. The SDP answer message can be based on a real-time transport control protocol (RTCP) feedback technique. As an example, the SDP answer message can accept an arbitrary ROI signaling capability, which can also include an acceptance of actual ROI signaling by the sender (i.e., the remote UE). As an example, the SDP answer message can include an RTCP feedback attribute that is associated with a Third Generation Partnership Project (3GPP) ROI-arbitrary parameter. As another example, the SDP answer message can include an extension map attribute that is associated with a Third Generation Partnership Project (3GPP) ROI-actual parameter.

Figure 6:
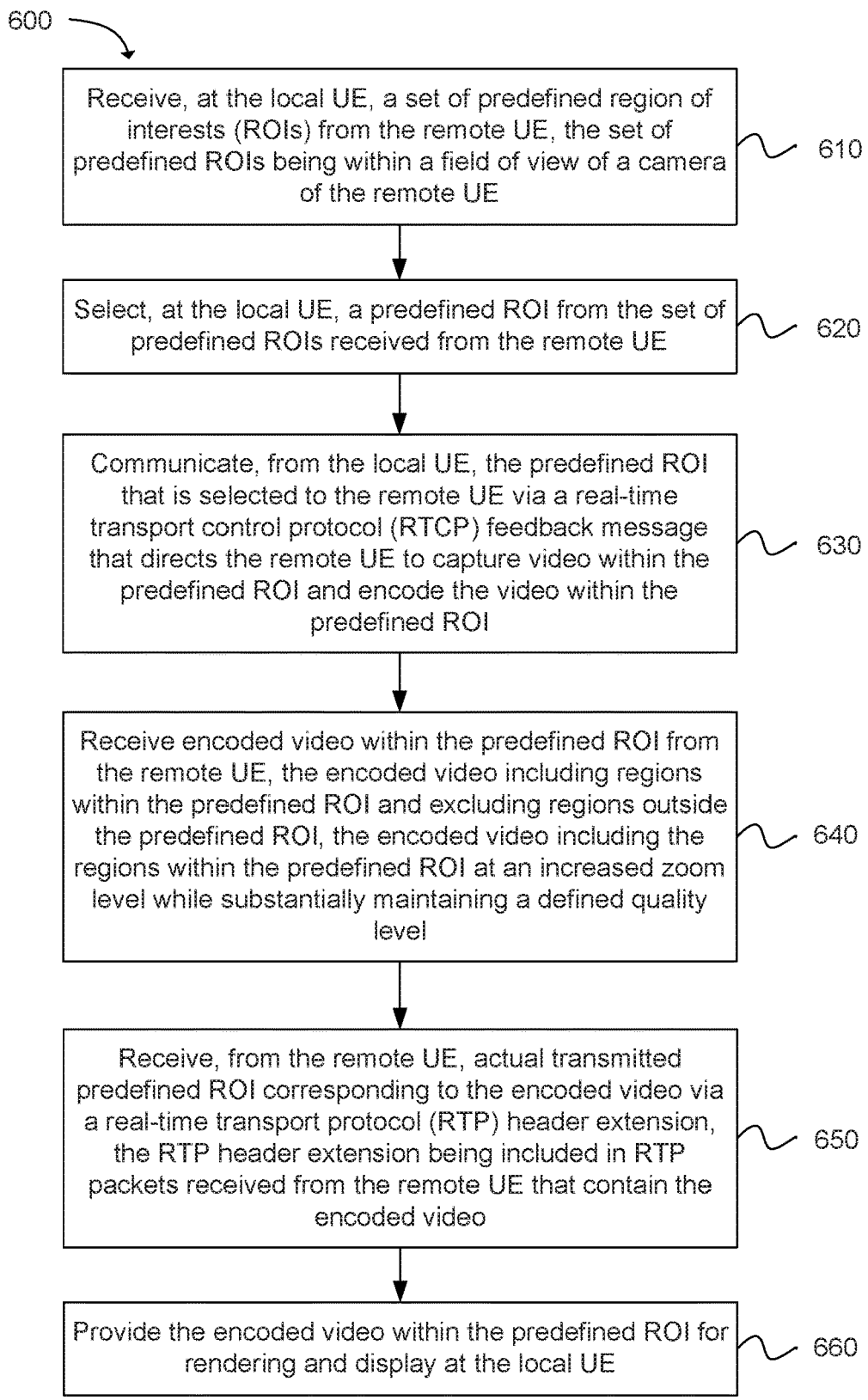
FIG. 6 depicts functionality of a local user equipment (UE) operable to perform video conferencing with a remote UE in accordance with an example.

Another example provides functionality 600 of a local user equipment (UE) operable to perform video conferencing with a remote UE, as shown in the flow chart in FIG. 6. The functionality can be implemented as a method or the functionality can be executed as instructions on a machine, where the instructions are included on at least one computer readable medium or one non-transitory machine readable storage medium. The local UE can have one or more processors configured to receive, at the local UE, a set of predefined region of interests (ROIs) from the remote UE, the set of predefined ROIs being within a field of view of a camera of the remote UE, as in block 610. The one or more processors can be configured to select, at the local UE, a predefined ROI from the set of predefined ROIs received from the remote UE, as in block 620. The one or more processors can be configured to communicate, from the local UE, the predefined ROI that is selected to the remote UE via a real-time transport control protocol (RTCP) feedback message that directs the remote UE to capture video within the predefined ROI and encode the video within the predefined ROI, as in block 630. The one or more processors can be configured to receive encoded video within the predefined ROI from the remote UE, the encoded video including regions within the predefined ROI and excluding regions outside the predefined ROI, the encoded video including the regions within the predefined ROI at an increased zoom level while substantially maintaining a defined quality level, as in block 640. The one or more processors can be configured to receive, from the remote UE, actual transmitted predefined ROI corresponding to the encoded video via a real-time transport protocol (RTP) header extension, the RTP header extension being included in RTP packets received from the remote UE that contain the encoded video, as in block 650. The one or more processors can be configured to provide the encoded video within the predefined ROI for rendering and display at the local UE, as in block 660.

In one configuration, a first processor can perform the operations in blocks 610, 630, 640 and 650. One example of the first processor is a baseband processor. In one configuration, a second processor can perform the operations in block 620 and 660. The second processor can be a single processor, or alternatively, the second processor can be comprised of one or more separate processors.

In one configuration, the one or more processors are further configured to: receive encoded video within a modified ROI from the remote UE, wherein the modified ROI is identified at the remote UE in response to detected motion within the field of view of the camera at the remote UE; and provide the encoded video within the modified ROI for rendering and display at the local UE.

In one configuration, the one or more processors are further configured to receive a session description protocol (SDP) offer message from the remote UE that includes an RTCP feedback attribute that is associated with a Third Generation Partnership Project (3GPP) ROI-predefined parameter, thereby indicating that the remote UE supports predefined ROI-based video capturing, predefined ROI-based video encoding and predefined ROI-based video transmissions.

In one example, the one or more processors are further configured to send a session description protocol (SDP) answer message to the remote UE that includes an RTCP feedback attribute that is associated with a Third Generation Partnership Project (3GPP) ROI-predefined parameter, thereby acknowledging that the remote UE supports predefined ROI-based video capturing, predefined ROI-based video encoding and predefined ROI-based video transmissions.

In one example, the one or more processors are further configured to receive a session description protocol (SDP) offer message from the remote UE that includes an extension map attribute that is associated with a Third Generation Partnership Project (3GPP) ROI-actual parameter, thereby indicating that the remote UE supports predefined ROI-based video capturing, predefined ROI-based video encoding and predefined ROI-based video transmissions.

In one example, the one or more processors are further configured to send a session description protocol (SDP) answer message to the remote UE that includes an extension map attribute that is associated with a Third Generation Partnership Project (3GPP) ROI-actual parameter, thereby acknowledging that the remote UE supports predefined ROI-based video capturing, predefined ROI-based video encoding and predefined ROI-based video transmissions.

In one example, the RTCP feedback message communicated from the local UE to the remote UE includes a descriptor that defines the predefined ROI that is selected from the set of predefined ROIs. In one example, the RTP header extension received from the remote UE includes a descriptor that defines the actual transmitted predefined ROI corresponding to the encoded video.

In one example, the RTP header extension received from the remote UE includes a position and a size associated with the actual transmitted predefined ROI corresponding to the encoded video from the remote UE. In one example, the position comprises two position values indicative of a corner position of the actual transmitted predefined ROI within the field of view at the remote UE, wherein the two position values are normalized to indicate relative position in two dimensions.

In one example, the size comprises two size values indicative of a size of the actual transmitted predefined ROI within the field of view at the remote UE, wherein the two size values are normalized to indicate relative size in two dimensions. In one example, the one or more processors are further configured to operate a video conferencing application with the remote UE that supports a defined ROI-based interactive zooming feature.

Figure 7:
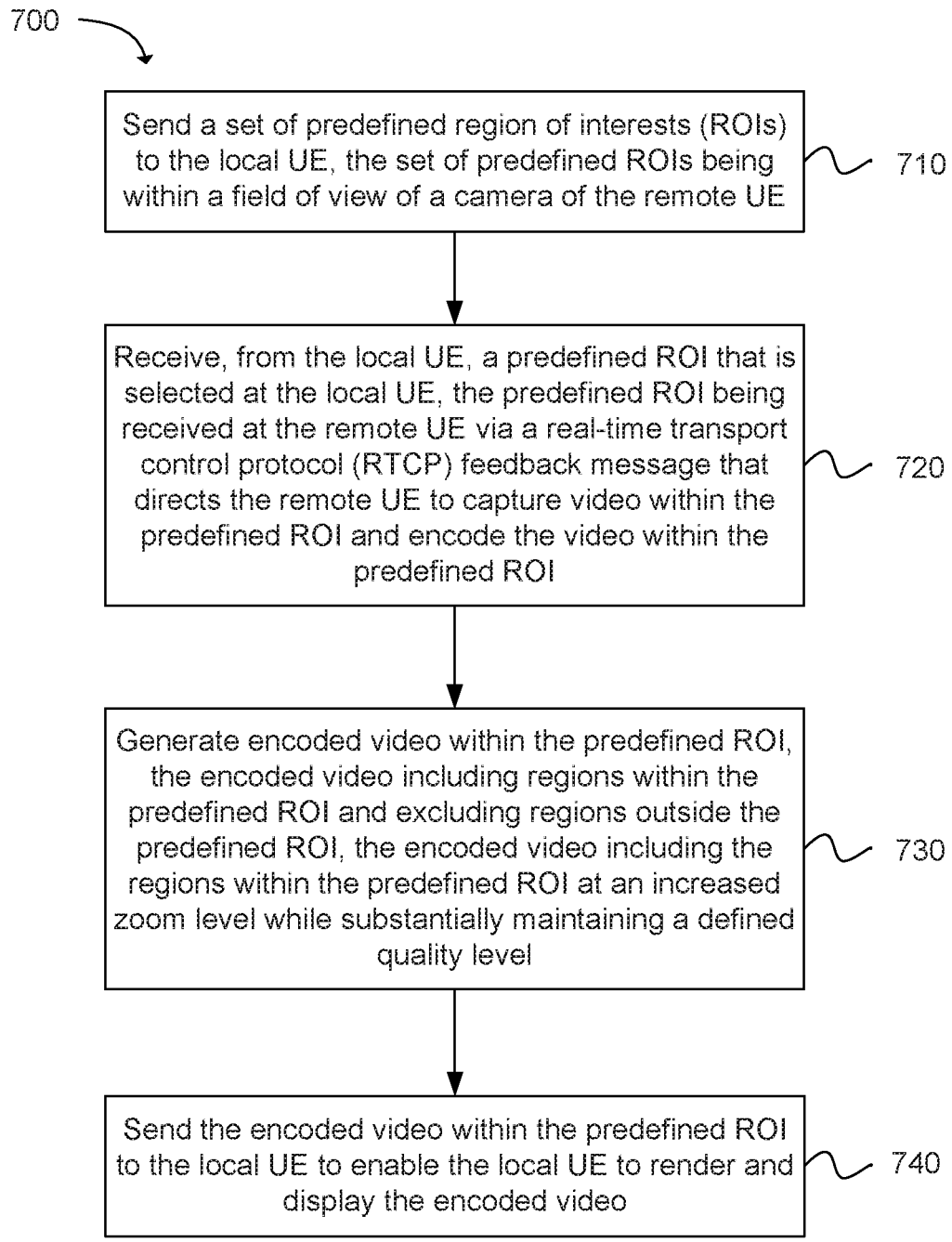
FIG. 7 depicts functionality of a remote user equipment (UE) operable to perform video conferencing with a local UE in accordance with an example.
Figure 8:
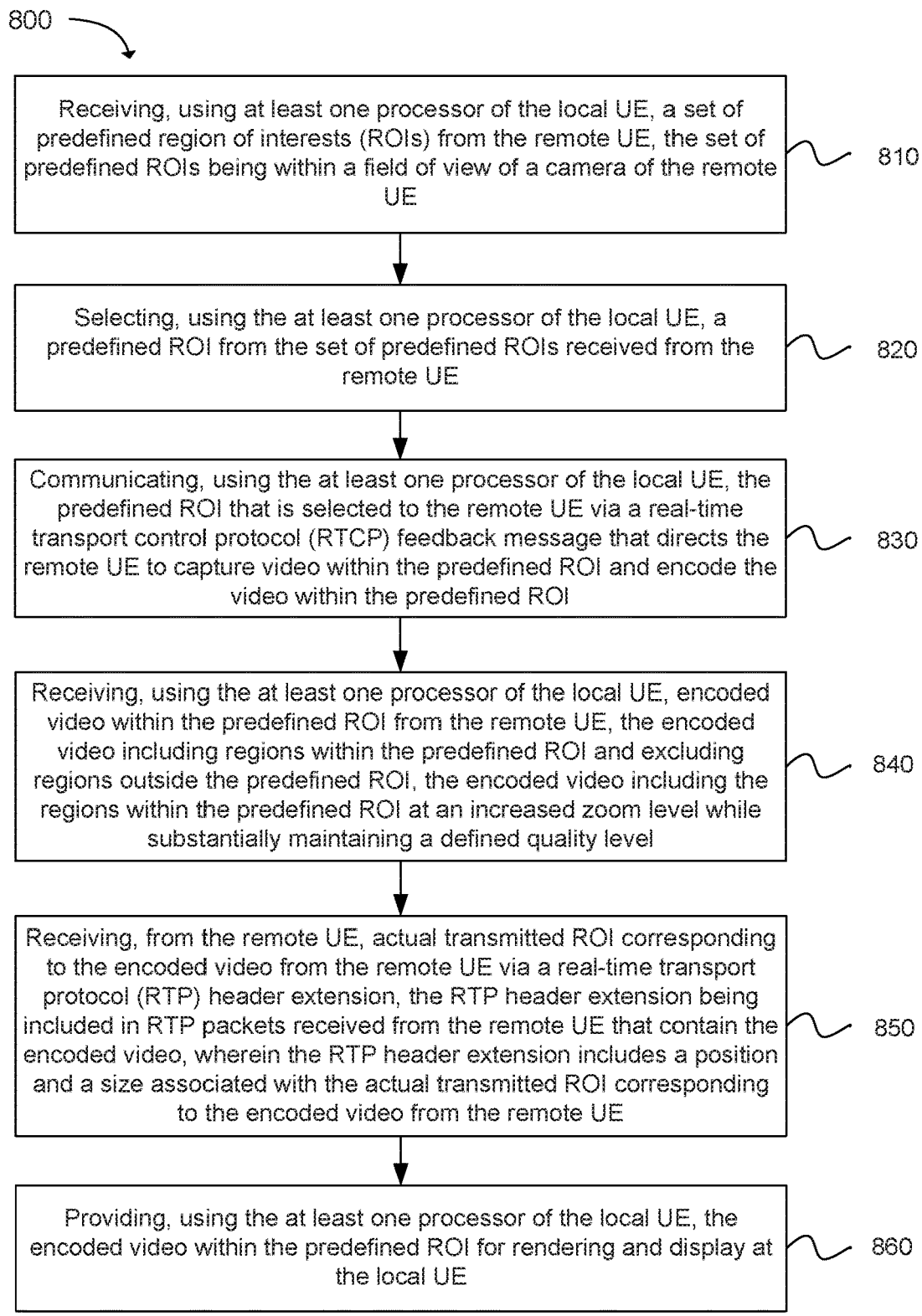
FIG. 8 depicts a flow chart of at least one non-transitory machine readable storage medium having instructions embodied thereon for operating a video conferencing application at a local user equipment (UE) that supports an interactive zooming feature in accordance with an example.

Another example provides functionality 700 of a remote user equipment (UE) operable to perform video conferencing with a local UE, as shown in the flow chart in FIG. 7. The functionality can be implemented as a method or the functionality can be executed as instructions on a machine, where the instructions are included on at least one computer readable medium or one non-transitory machine readable storage medium. The remote UE can have one or more processors configured to send a set of predefined region of interests (ROIs) to the local UE, the set of predefined ROIs being within a field of view of a camera of the remote UE, as in block 710. The one or more processors can be configured to receive, from the local UE, a predefined ROI that is selected at the local UE, the predefined ROI being received at the remote UE via a real-time transport control protocol (RTCP) feedback message that directs the remote UE to capture video within the predefined ROI and encode the video within the predefined ROI, as in block 720. The one or more processors can be configured to generate encoded video within the predefined ROI, the encoded video including regions within the predefined ROI and excluding regions outside the predefined ROI, the encoded video including the regions within the predefined ROI at an increased zoom level while substantially maintaining a defined quality level, as in block 730. The one or more processors can be configured to send the encoded video within the predefined ROI to the local UE to enable the local UE to render and display the encoded video, as in block 740.

In one configuration, a first processor can perform the operations in blocks 710, 720 and 740. One example of the first processor is a baseband processor. In one configuration, a second processor can perform the operation in block 730. The second processor can be a single processor, or alternatively, the second processor can be comprised of one or more separate processors.

In one configuration, the one or more processors are further configured to: detect motion within the field of view of the camera at the remote UE; identify a modified ROI based on the motion detected within the field of view of the camera; generate encoded video within the modified ROI, the encoded video including regions within the modified ROI and excluding regions outside the modified ROI; and send the encoded video within the modified ROI to the local UE to enable the local UE to render and display the encoded video. In one example, the encoded video is captured using a fixed non-moving camera of the remote UE.

Another example provides functionality 800 of at least one non-transitory machine readable storage medium having instructions embodied thereon for operating a video conferencing application at a local user equipment (UE) that supports an interactive zooming feature. The instructions, when executed, can cause the local UE to perform receiving, using at least one processor of the local UE, a set of predefined region of interests (ROIs) from the remote UE, the set of predefined ROIs being within a field of view of a camera of the remote UE, as in block 810. The instructions, when executed, can cause the local UE to perform selecting, using the at least one processor of the local UE, a predefined ROI from the set of predefined ROIs received from the remote UE, as in block 820. The instructions, when executed, can cause the local UE to perform communicating, using the at least one processor of the local UE, the predefined ROI that is selected to the remote UE via a real-time transport control protocol (RTCP) feedback message that directs the remote UE to capture video within the predefined ROI and encode the video within the predefined ROI, as in block 830. The instructions, when executed, can cause the local UE to perform receiving, using the at least one processor of the local UE, encoded video within the predefined ROI from the remote UE, the encoded video including regions within the predefined ROI and excluding regions outside the predefined ROI, the encoded video including the regions within the predefined ROI at an increased zoom level while substantially maintaining a defined quality level, as in block 840. The instructions, when executed, can cause the local UE to perform receiving, from the remote UE, actual transmitted ROI corresponding to the encoded video from the remote UE via a real-time transport protocol (RTP) header extension, the RTP header extension being included in RTP packets received from the remote UE that contain the encoded video, wherein the RTP header extension includes a position and a size associated with the actual transmitted ROI corresponding to the encoded video from the remote UE, as in block 850. The instructions, when executed, can cause the local UE to perform providing, using the at least one processor of the local UE, the encoded video within the predefined ROI for rendering and display at the local UE, as in block 860.

In one configuration, the at least one non-transitory machine readable storage medium can further comprise instructions which when executed by the at least one processor of the local UE performs the following: receiving encoded video within a modified ROI from the remote UE, wherein the modified ROI is identified at the remote UE in response to detected motion within the field of view of the camera at the remote UE; and providing the encoded video within the modified ROI for rendering and display at the local UE.

In one configuration, the at least one non-transitory machine readable storage medium can further comprise instructions which when executed by the at least one processor of the local UE performs the following: receiving a session description protocol (SDP) offer message from the remote UE that includes an RTCP feedback attribute that is associated with a Third Generation Partnership Project (3GPP) ROI-predefined parameter or an extension map attribute that is associated with a Third Generation Partnership Project (3GPP) ROI-actual parameter, thereby indicating that the remote UE supports predefined ROI-based video capturing, predefined ROI-based video encoding and predefined ROI-based video transmissions.

In one configuration, the at least one non-transitory machine readable storage medium can further comprise instructions which when executed by the at least one processor of the local UE performs the following: sending a session description protocol (SDP) answer message to the remote UE that includes an RTCP feedback attribute that is associated with a Third Generation Partnership Project (3GPP) ROI-predefined parameter or an extension map attribute that is associated with a Third Generation Partnership Project (3GPP) ROI-actual parameter, thereby acknowledging that the remote UE supports predefined ROI-based video capturing, predefined ROI-based video encoding and predefined ROI-based video transmissions.

Figure 9:
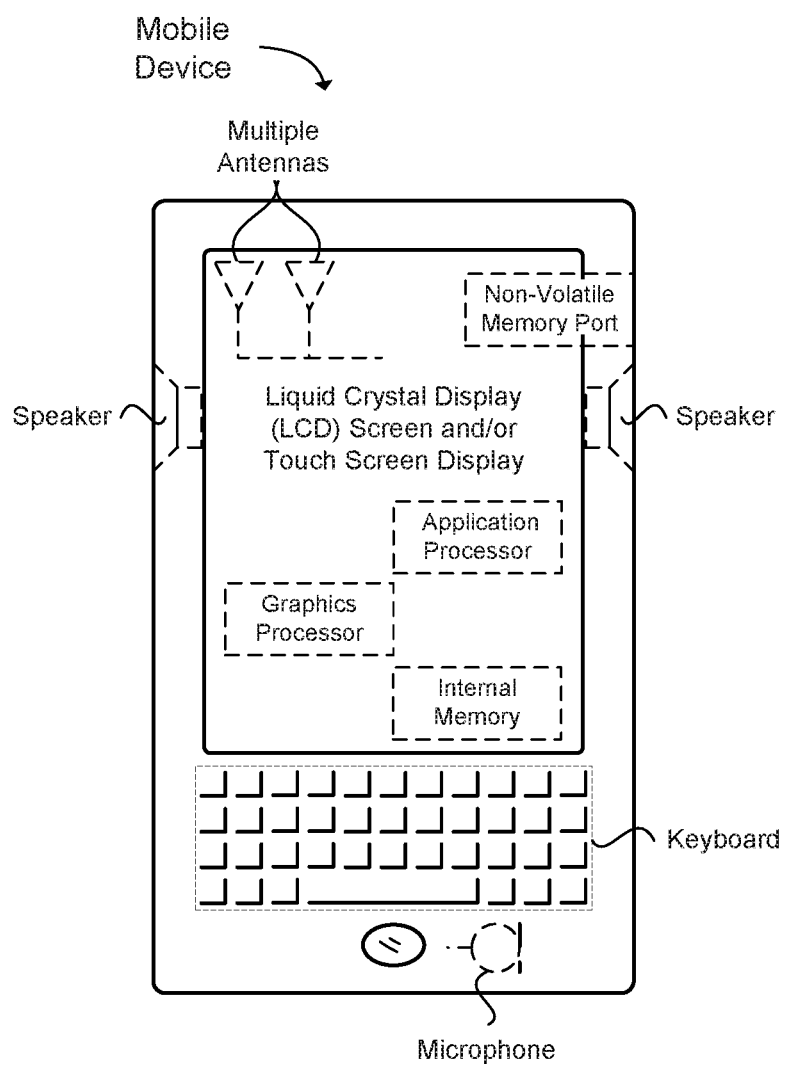
FIG. 9 illustrates a diagram of a wireless device (e.g., UE) in accordance with an example.

In one configuration, the RTCP feedback message communicated from the local UE to the remote UE includes a descriptor that defines the predefined ROI that is selected from the set of predefined ROIs. In one configuration, the RTP header extension received from the remote UE includes a descriptor that defines the actual transmitted predefined ROI corresponding to the encoded video FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a multimedia telephony services over internet protocol (IP) multimedia subsystems (IMS) (MTSI) receiver operable to support region of interest (ROI) signaling with a MTSI sender, the apparatus including:
   one or more processors configured to:
   decode, at the MTSI receiver, ROI information received from the MTSI sender, wherein the ROI information includes a set of predefined ROIs;
   encode, at the MTSI receiver, a selected predefined ROI for transmission to the MTSI sender in a real-time transport control protocol (RTCP) feedback message; and
   decode, at the MTSI receiver, encoded video received from the MTSI sender, wherein the encoded video corresponds to the selected predefined ROI; and
   memory configured to store the set of predefined ROIs received from the MTSI sender.

2. The apparatus of claim 1, further comprising a transceiver configured to:
   receive the ROI information from the MTSI sender;
   transmit the selected predefined ROI to the MTSI sender; and
   receive the encoded video from the MTSI sender.

3. The apparatus of claim 1, wherein the one or more processors are further configured to select a predefined ROI from the set of predefined ROIs received from the MTSI sender.

4. The apparatus of claim 1, wherein the one or more processors are further configured to decode a sent ROI received from the MTSI sender in a real-time transport protocol (RTP) header extension, wherein the sent ROI indicates an actually sent ROI corresponding to the encoded video received from the MTSI sender.

5. The apparatus of claim 1, wherein the one or more processors are further configured to decode a session description protocol (SDP) offer received from the MTSI sender, wherein the SDP offer indicates that the MTSI sender supports a predefined ROI feature.

6. The apparatus of claim 1, wherein the one or more processors are further configured to encode a session description protocol (SDP) answer for transmission to the MTSI sender, wherein the SDP answer acknowledges that the MTSI sender supports a predefined ROI feature.

7. The apparatus of claim 1, wherein the ROI information includes one or more of:
   a ROI identifier (ID) for each predefined ROI in the set of predefined ROIs;
   position values for each predefined ROI in the set of predefined ROIs; or
   size values for each predefined ROI in the set of predefined ROIs.

8. The apparatus of claim 1, wherein the selected predefined ROI is signaled to the MTSI sender in the RTCP feedback message using an attribute of a=rtcp-fb:*3gpp-roi-predefined.

9. An apparatus of a multimedia telephony services over internet protocol (IP) multimedia subsystems (IMS) (MTSI) sender operable to support region of interest (ROI) signaling with a MTSI receiver, the apparatus including:
   one or more processors configured to:
   encode, at the MTSI sender, ROI information for transmission to the MTSI receiver, wherein the ROI information includes a set of predefined ROIs;
   decode, at the MTSI sender, a real-time transport control protocol (RTCP) feedback message received from the MTSI receiver, wherein the RTCP feedback message includes a selected predefined ROI from the set of predefined ROIs; and
   encode, at the MTSI sender, video for transmission to the MTSI receiver, wherein the encoded video corresponds to the selected predefined ROI; and
   memory configured to store the selected predefined ROI received from the MTSI receiver.

10. The apparatus of claim 9, further comprising a transceiver configured to:

transmit the ROI information to the MTSI receiver;
receive the selected predefined ROI from the MTSI receiver; and
transmit the encoded video to the MTSI receiver.

11. The apparatus of claim 9, wherein the one or more processors are further configured to encode a sent ROI for transmission to the MTSI receiver in a real-time transport protocol (RTP) header extension, wherein the sent ROI indicates an actually sent ROI corresponding to the encoded video transmitted to the MTSI receiver.

12. The apparatus of claim 9, wherein the one or more processors are further configured to encode a session description protocol (SDP) offer for transmission to the MTSI receiver, wherein the SDP offer indicates that the MTSI sender supports a predefined ROI feature.

13. The apparatus of claim 9, wherein the one or more processors are further configured to decode a session description protocol (SDP) answer received from the MTSI receiver, wherein the SDP answer acknowledges that the MTSI sender supports a predefined ROI feature.

14. The apparatus of claim 9, wherein the ROI information includes one or more of:
a ROI identifier (ID) for each predefined ROI in the set of predefined ROIs;
position values for each predefined ROI in the set of predefined ROIs; or
size values for each predefined ROI in the set of predefined ROIs.

15. The apparatus of claim 9, wherein the selected ROI is received the MTSI receiver in the RTCP feedback message using an attribute of a=rtcp-fb:*3gpp-roi-predefined.

16. At least one non-transitory machine readable storage medium having instructions embodied thereon for supporting region of interest (ROI) signaling between a multimedia telephony services over internet protocol (IP) multimedia subsystems (IMS) (MTSI) receiver and a MTSI sender, the instructions when executed by one or more processors at the MTSI receiver performs the following:
decoding, at the MTSI receiver, ROI information received from the MTSI sender, wherein the ROI information includes a set of predefined ROIs;
selecting, at the MTSI receiver, a predefined ROI from the set of predefined ROIs received from the MTSI sender;
encoding, at the MTSI receiver, the selected predefined ROI for transmission to the MTSI sender in a real-time transport control protocol (RTCP) feedback message; and
decoding, at the MTSI receiver, encoded video received from the MTSI sender, wherein the encoded video corresponds to the selected predefined ROI.

17. The at least one non-transitory machine readable storage medium of claim 16, further comprising instructions when executed by the one or more processors performs the following: decoding a sent ROI received from the MTSI sender in a real-time transport protocol (RTP) header extension, wherein the sent ROI indicates an actually sent ROI corresponding to the encoded video received from the MTSI sender.

18. The at least one non-transitory machine readable storage medium of claim 16, further comprising instructions when executed by the one or more processors performs the following: decoding a session description protocol (SDP) offer received from the MTSI sender, wherein the SDP offer indicates that the MTSI sender supports a predefined ROI feature.

19. The at least one non-transitory machine readable storage medium of claim 16, further comprising instructions when executed by the one or more processors performs the following: encoding a session description protocol (SDP) answer for transmission to the MTSI sender, wherein the SDP answer acknowledges that the MTSI sender supports a predefined ROI feature.

20. The at least one non-transitory machine readable storage medium of claim 16, wherein the ROI information includes one or more of:
a ROI identifier (ID) for each predefined ROI in the set of predefined ROIs;
position values for each predefined ROI in the set of predefined ROIs; or
size values for each predefined ROI in the set of predefined ROIs.

21. The at least one non-transitory machine readable storage medium of claim 16, wherein the selected predefined ROI is signaled to the MTSI sender in the RTCP feedback message using an attribute of a=rtcp-fb:*3gpp-roi-predefined.

22. At least one non-transitory machine readable storage medium having instructions embodied thereon for supporting region of interest (ROI) signaling between a multimedia telephony services over internet protocol (IP) multimedia subsystems (IMS) (MTSI) sender and a MTSI receiver, the instructions when executed by one or more processors at the MTSI sender performs the following:
encoding, at the MTSI sender, ROI information for transmission to the MTSI receiver, wherein the ROI information includes a set of predefined ROIs;
decoding, at the MTSI sender, a real-time transport control protocol (RTCP) feedback message received from the MTSI receiver, wherein the RTCP feedback message includes a selected predefined ROI from the set of predefined ROIs; and
encoding, at the MTSI sender, video for transmission to the MTSI receiver, wherein the encoded video corresponds to the selected predefined ROI.

23. The at least one non-transitory machine readable storage medium of claim 22, further comprising instructions when executed by the one or more processors performs the following: encoding a sent ROI for transmission to the MTSI receiver in a real-time transport protocol (RTP) header extension, wherein the sent ROI indicates an actually sent ROI corresponding to the encoded video transmitted to the MTSI receiver.

24. The at least one non-transitory machine readable storage medium of claim 22, further comprising instructions when executed by the one or more processors performs the following: encoding a session description protocol (SDP) offer for transmission to the MTSI receiver, wherein the SDP offer indicates that the MTSI sender supports a predefined ROI feature.

25. The at least one non-transitory machine readable storage medium of claim 22, further comprising instructions when executed by the one or more processors performs the following: decoding a session description protocol (SDP) answer received from the MTSI receiver, wherein the SDP answer acknowledges that the MTSI sender supports a predefined ROI feature.

26. The at least one non-transitory machine readable storage medium of claim 22, wherein the ROI information includes one or more of:
a ROI identifier (ID) for each predefined ROI in the set of predefined ROIs;
position values for each predefined ROI in the set of predefined ROIs; or size values for each predefined ROI in the set of predefined ROIs.

27. The at least one non-transitory machine readable storage medium of claim 22, wherein the selected predefined ROI is received the MTSI receiver in the RTCP feedback message using an attribute of a=rtcp-fb:*3gpp-roi-predefined.

* * * * *